3,155,407
BALL AND SOCKET JOINTS
Rudolf Gottschald, Osterath, Germany, assignor to A. Ehrenreich & Cie, Dusseldorf-Oberkassel, Germany, a German company
Filed May 17, 1962, Ser. No. 195,511
Claims priority, application Germany May 26, 1961
2 Claims. (Cl. 287—87)

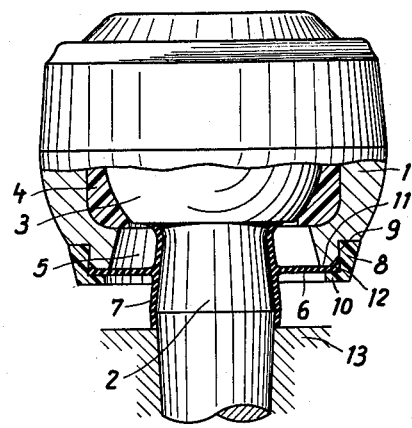

This invention relates to ball and socket joints in which the clearance between the pin which carries the ball and the opening in the socket through which the pin projects is sealed.

It is an object of the present invention to make the seal as complete as possible without making the joint too stiff and also to ensure that seal is adequately protected from mechanical damage.

This object may be achieved to some extent by sealing the clearance by a flexible diaphragm like disc which fits around the pin and the edge of which is fixed to the socket.

The advantage of such ball joints as this is that the seal is satisfactory, yet the seal, being readily deformable, does not inhibit movement of the pin excessively and, being mostly disposed inside the socket, the seal is not readily damaged by external causes. However, the diaphragm-like disc may ride up the pin, in which event the pin may be damaged if it moves considerably or the disc may be squeezed between the pin and the edge of the opening if the pin is deflected considerably. Once the seal is damaged, a joint which is not regularly lubricated is destroyed.

According to this invention, in such a ball joint, the flexible diaphragm-like disc has an integral sleeve which fits tightly around the pin and extends along the pin from the disc into contact with the ball. The sleeve prevents the disc from riding up towards the ball end. It thus acts as a spacer for the disc and also improves the sealing tightness. Preferably the sleeve also extends along the pin from the disc in a direction away from the ball. This end further improves the sealing-tightness and the fit of the disc on the pin.

An example of a ball and socket joint in accordance with the invention is illustrated in the accompanying drawing which is a vertical section through the joint.

The joint comprises a socket 1 and a pin 2 which carries a ball 3 mounted in the socket 1. The pin 2 and ball 3 can rock in all directions. A bearing shell 4 for the ball 3 is provided around the opening 5 through which the pin 2 extends from the socket 1. In this example, the shell 4 is made of a resilient plastic. The opening 5 through which the pin 2 extends is larger than the cross-section of the pin 2 so that the pin can rock. That part of the aperture 5 which is not occupied by the pin 2 is closed by a diaphragm-like flexible sealing disc 6. The pin 2 extends through an opening in the centre of the disc 6. Disposed around the edge of the opening in the disc 6 is a sleeve 7 which projects on both sides of the disc 6 and fits tightly around the pin 2. The sleeve 7 extends into contact with the ball 3.

The outer edge of the disc 6 is fixed to the outside of the socket 1 by means of a securing ring 8. This ring is pressed on to a step 9 on the socket 1 and has an internal shoulder 10 which projects towards the pin 2. By way of the shoulder 10, the ring 8 engages over the edge of the disc 6 and presses the edge against a flattened part 11 of the socket 1. The disc 6 has a thickened part 12 around its edge. The part 12 is disposed in the gap between the ring 8 and the outside surface of the socket 1. A member 13 engages around the pin 2. On the side remote from the ball 3, the sleeve 7 extends as far as the member 13.

I claim:
1. A ball and socket joint comprising
   a socket having wall means defining an opening,
   a stud having a ball head at one end received in said socket and a shank portion extending through said opening, said opening providing a clearance space relative to said shank portion to allow limited angular movement of said stud in said socket,
   a sealing member having a central sleeve portion engaging around said shank portion in said opening and a flexible plane disc portion connected to said sleeve portion intermediate its ends and extending radially from said sleeve portion into contact with the end of said socket at said opening,
   said sleeve portion extending upwardly from said radial disc portion into engagement with said ball head,
   and means for fixing a peripheral portion of said radial disc portion to said socket at said opening.
2. A ball and socket joint comprising
   a socket having wall means defining an opening,
   a stud having a ball head at one end received in said socket and a shank portion extending through said opening,
   said opening providing a clearance space relative to said shank portion to allow limited angular movement of said stud in said socket,
   a sealing member having a central sleeve portion engaging around said shank portion in said opening and a flexible plane disc portion connected to said sleeve portion intermediate its ends and extending radially from said sleeve portion into contact with the end of said socket at said opening,
   said sleeve portion extending upwardly from said radial disc portion into engagement with said ball head,
   and annular retaining means for fixing a peripheral portion of said radial disc portion to said socket at said opening,
   said annular retaining means having an inwardly directed flange extending over said peripheral portion of said disc portion.

References Cited in the file of this patent
UNITED STATES PATENTS

| | | |
|---|---|---|
| 2,107,090 | Swennes | Feb. 1, 1938 |
| 2,470,205 | Alldredge | May 17, 1949 |
| 2,545,605 | Canine | Mar. 20, 1951 |
| 2,559,857 | Edwards | July 10, 1951 |
| 2,580,383 | Frank | Jan. 1, 1952 |
| 2,752,180 | Vogt | June 26, 1956 |

FOREIGN PATENTS

| | | |
|---|---|---|
| 1,131,566 | France | Oct. 22, 1956 |